Feb. 15, 1955     S. H. SVENSSON     2,701,961
OSMOMETER
Filed April 26, 1954
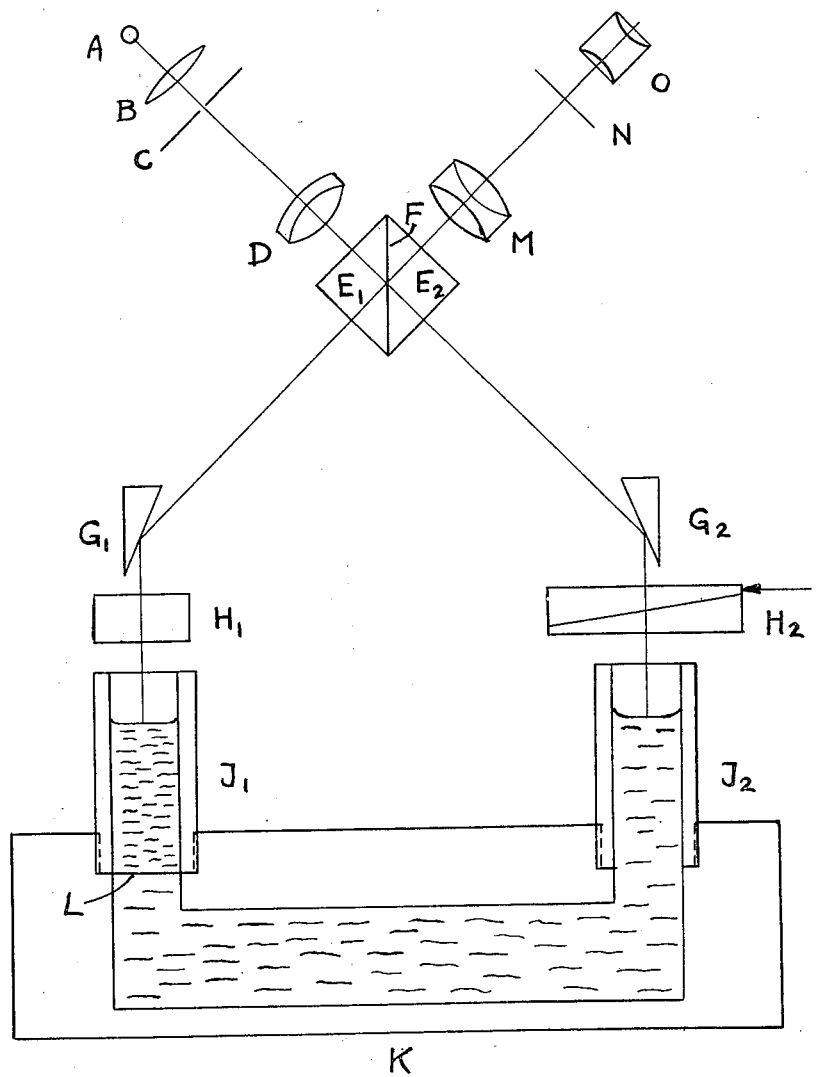
Inventor:-
Svante Harry Svensson,
by Pierce, Scheffler & Parker,
Attorneys.

United States Patent Office 2,701,961
Patented Feb. 15, 1955

2,701,961

OSMOMETER

Svante Harry Svensson, Sundbyberg, Sweden, assignor to LKB-Produkter Fabriksaktiebolag, Stockholm, Sweden Application April 26, 1954, Serial No. 425,622

Claims priority, application Sweden September 4, 1953

2 Claims. (Cl. 73—53)

Measurement of osmotic pressure is carried out for the determination of molecular weights of high-molecular substances. Since such substances are characterized by only small osmotic effects in solutions, the osmotic pressures obtained are very low, and it is difficult to get a sufficient accuracy in such measurements. It is still more difficult for such substances which require an extrapolation to the concentration O in order to give a correct result. This is the case with most high polymers, the solutions of which are characterized by a considerable mutual interaction between the dissolved molecules. Accurate osmotic measurements then present technical problems that are very difficult to solve.

In order to increase the accuracy at the measurement of small osmotic pressures, Jullander (Ark. Kem. Min. Geol. 21 A, No. 8, 1945) and Enoksson (J. Polymer Science 3, 314, 1948; ibid. 6, 575, 1951) have constructed an osmotic balance. Hereby it has been possible to reach a considerable increase in the accuracy, the direct measurement of a difference in level being replaced by a weighing.

Claesson (not published; the instrument shown at the exhibition in connection with Instruments and Measurements Conference, Stockholm 1952) has instead increased the accuracy by resorting to interferometric measurement of the difference in level between the two menisci of the osmotic cell. The present invention is also based on interferometric measurement, but is fundamentally different from Claesson's construction.

The requirements which should be put on an interferometric osmometer can be formulated as follows: (1) The interferometric arrangement must produce two mutually parallel, coherent, vertical beams of light. (2) In one and the same horizontal plane, these two beams of light should have traversed the same optical path length, i. e., the integral $\int n dx$, where $n$ is the refractive index and $x$ is geometric distance, should have the same numerical value when it is computed from the light-splitting device to the horizontal plane in question over both paths of the coherent beams of light. (3) The arrangement should permit an arbitrary distance between the coherent beams of light, in order to give great freedom in the construction of the osmotic cell. (4) The arrangement should be such as to allow the menisci to have a relatively great curvature without the conditions for interference being abolished, since otherwise the tubes with the menisci must have relatively large diameters and the cell requires considerable amounts of material. (5) The arrangement should be characterized by a light intensity great enough for using light that is reflected against the menisci. First, the double sensitivity is gained in this way, the light traversing twice the distance to be measured; second, one becomes independent of the refractive indices of the solution and the solvent, which have to be known if use is made of light that passes through the menisci. (6) The arrangement should be easily adjusted and as simple as possible in use. (7) The arrangement should preferably be such as to give a reading which varies linearly with the level difference between the menisci.

Among these requirements, the instrument mentioned above satisfies only Nos. (1), (2) and (6). The reasons why the other requirements are not satisfied will be analyzed below.

Claesson makes use of Rayleigh's interferometer in his construction. The two coherent beams of light in such an instrument must pass relatively close together in order to prevent the interfering fringes from coming inconveniently close together and the light intensity from becoming inconveniently low. Further, the instrument is characterized in that optical imagery of the light source slit is a necessary condition for interference. It follows from that that the object must be optically homogeneous and of constant thickness, since in the opposite case the imagery of the light source slit would be disturbed and the conditions for interference disappear. Consequently large menisci with a negligible curvature are required, which in itself is a drawback and, moreover, causes difficulties with regard to what was just pointed out concerning the distance between the coherent pencils. The light intensity in a Rayleigh interferogram is low, and it becomes the lower the greater distance between the coherent pencils one is forced to use. It is therefore impossible to operate with the light that is reflected against the menisci, and one has to let the light pass through them. Thereby the construction of the osmotic cell becomes more complicated, however, and, further, one loses in sensitivity and becomes dependent on measurement of two refractive indices.

The inconveniences which have been discussed above are partly removed if one switches from Rayleigh's interferometer to other intereferometers. If for example an arrangement according to Jamin or Michelson is chosen, it is no longer necessary to produce an optical image of the light source, but the interference phenomenon can take place in the optical image of the object. This may then possess a small curvature without the observations being made impossible. On the other hand, these types of interferometers do not satisfy the requirements (1) and (2), as the Rayleigh interferometer did. Nor can they be said to be particularly good with respect to light intensity, since they require a point source in the collimator, and the adjustment cannot be said to be easy.

These new and remaining inconveniences are connected with the deficient conditions for the optical imagery of the object and the reference object in these types of interferometers. In Jamin's interferometer the object and the reference object are placed side by side perpendicularly to the light path between the two inclined plates. By the optical imagery of these objects through a spherical lens system the rays from one object pass the inclined plate twice on their way to the lens system, while the rays from the other object are only reflected against the front surface of the same plate. The geometric-optical distances of the two objects to the lens system thus become different, with the result that their optical images do not lie in the same plane. For interference to come about the following three conditions must be fulfilled: (1) the light-indicating device must lie in the optical image plane of the object being investigated; (2) the reference object must have a constant optical thickness being essentially the same as that of the object; (3) both objects must be illuminated with light of constant entrance angle, i. e. the light source in the collimator must be point-shaped. The first requirement is self-evident, since one cannot otherwise expect to get a realistic mapping of the optical thickness of the object. The necessity of the second requirement is evident from the following discussion. If the reference object has a variable optical thickness, the direction of the pencils will change in it, and the resulting oblique rays do not return to the correct object plane coordinate until in the optical image plane of the reference object. This does not coincide, however, with the optical image plane of the object to be measured. In the latter, therefore, where the light-indicating device is situated, the pencil from the reference object will pass at a wrong place. It will thus not meet the corresponding coherent pencil from the object to be measured on the light-indicating device, and the conditions for interference will thus not be satisfied. The third requirement must be fulfilled for the same reason: if the reference object has a constant optical thickness, but is illuminated by pencils from different points of an extended light source, then a divergent light beam will originate from each point of the object. The pencils in this beam will be reunited to one point only in the optical image plane of the reference object. Since this does not coincide with the optical image plane of the object under investigation and with the light-indicating device, the latter will be illuminated over an area which is the section between the light-indicating device and the cone of light which is formed by the converging light beam from the considered point in the reference object. The corresponding light beam from the corresponding point of the object to be measured illuminates just one point on the light-indicating device. Among all the pencils in the two divergent light beams, only the two central pencils parallel to the axis will thus pass through the same point at the light-indicating device, and only these two rays are capable of interference. All other pencils only give rise to diffuse illumination without interference phenomena.

The conditions are better in a Michelson interferometer with a compensating plate, for there both coherent beams must pass each one inclined plate of the same thickness on the way from object to the lens system giving an image thereof. Consequently, object and reference object can be focused in the same plane on the same light-indicating device. The impossibility of using an extended light source in the collimator without impairing the contrast of the interferogram is connected with the dioptric properties of the inclined plates.

A plano-parallel plate perpendicular to the light path is known to be rather harmless in monochromatic light from a geometric-optic point of view. If a small influence on the spherical aberration, which can be corrected for at the design of the lens system, is disregarded, its action can simply be so described, that it is equivalent with a layer of air of thickness $d/n$, where $d$ is the thickness of the plate and $n$ its refractive index. With an inclined glass plate matters are not so simple. Thus such a plate is known to possess astigmatic properties, i. e. it displaces the optical image plane different amounts in two mutually perpendicular planes. Further, the longitudinal as well as the transversal image plane displacements are strongly dependent on the entrance angles of the rays towards the plate. A good focusing of strongly divergent or convergent beams of light is thus on the whole impossible through an inclined plate. This fact leads to the conclusion that even Michelson's interferometer with a compensating plate must be served by a light source of little extension in the focal plane of the collimating lens.

According to the above discussion, strongly divergent light beams through the objects, and thus an extended light source, could thus be used if the two following requirements are satisfied: (1) prevailing phase boundaries at which refraction occurs should all lie perpendicularly against the central ray of the divergent or convergent beams, respectively; (2) the two objects should have the same geometric-optic distance from the foil in which the coherent beams are reunited, i. e. the integral $\int dx/n$, where $x$ is geometric distance and $n$ refractive index, shall have the same value along the paths of the two coherent, central rays when it is taken from the objects of the beam-reuniting foil. In addition, we have the condition necessary in all interference that (3) the physical-optical distance between beam-splitting and -reuniting foils shall be the same along the paths of the two coherent beams, i. e. the integral $\int ndx$ shall have the same numerical value when it is taken from foil to foil along the paths of the two central, coherent beams of light, the differences between the objects under measurement being disregarded.

The requirement (1) is somewhat more general and restrictive than what is immediately caused by the preceding text. It becomes, however, understandable on considering the self-evident fact that an inclined air plate in a glass block, or an arrangement equivalent thereto, must be as unfavourable from a geometric-optic point of view as an inclined glass plate in air. The requirement leads to the conclusion that the half-transparent foils must be in optical contact with glass or other homogeneous material on both sides.

An interferometric system in which both foils lie in the same plane and which is besides characterized by a complete mirror symmetry with regard to this plane, satisfies the requirements (2) and (3), and such systems represent therefore closely at hand lying ways of making interferometers with a high light intensity. Systems which can be thought to be formed from mirror-symmetric systems by the introduction of reflexions in one light path with the aid of plane mirrors, by alterations in such reflexions, or by parallel displacement of plane glass plates, also satisfy the requirements (2) and (3).

Mirror-symmetric beam-splitting devices, which also satisfy the requirement (1) above, have been described in the optical literature, but their favourable properties with regard to light intensity do not seem to be known to the experts. Thus Koesters has carried out measurements with a double prism consisting of two 30, 60, 90° prism, the long cathetus surface of one such prism having been semi-foliated and then brought into optical contact with the the corresponding surface of the other prism (Werkstattechnik und Werksleiter 32,527, 1938). This prism constitutes of course only an example of an interferometric device which can very suitably be used in the present invention.

If these conclusions regarding a suitable interferometric arrangement for an osmometer, which resulted from the above requirements (4) and (5), are put together with other desiderata put forward there, one will find that they can all be easily satisfied by an arrangement of the properties discussed above. Thus the first requirement is satisfied if a vertically oriented light-splitting foil is chosen, and if two plane mirrors are introduced which give a vertical direction to the light falling obliquely against the foil. The requirement (2) will be satisfied if one arranges for a complete mirror-symmetry with regard to the light-splitting foil. The third requirement is easily satisfied by parallel displacement of the plane mirrors mentioned above. The requirement (6) will become fulfilled, since an interferometer permitting an extended light source is very easy to adjust. The seventh requirement, finally, concerns only the choice of optical compensator which is treated further on.

The invention as a whole can thus be described in the following way. It consists of an osmotic cell with two vertical tubes, one for the solution and one for the solvent, of a half-transparent metal foil so oriented in a vertical plane that the two vertical tubes become mutual mirror images with regard to the foil, the foil being supported by and in optical contact with two optical elements of transparent and homogeneous material and with well-defined outer boundary surfaces which are mutual mirror-images with regard to the foil, further of two reflecting surfaces, also mutual mirror-images with regard to the foil, which reflect the coherent beams of light coming therefrom strictly downwards against the two menisci and which reflect the radiation returning from the menisci back to the foil, further of an illumination and collimating arrangement which directs radiation obliquely against the vertical foil, of an optical system giving optical imagery of the menisci and built on an optic axis which at least next to the foil is the mirror-image of the axis of the collimator with regard to the foil, and in the way of one of the coherent light beams an optical compensator for continuous variation of the optical path length, and in the way of the other light beam a fixed plate of essentially the same optical thickness as the compensator. The whole optical system further characterized in that every phase boundary between two media at which refraction occurs is oriented perpendicularly to the central ray of the beam which strikes the phase boundary.

A form of the invention, well adapted to its purpose, is shown in Fig. 1. A is the light source, suitably a white incandescent lamp, B a condensing lens which concentrates the light of the lamp on the iris diaphragm C. This is situated in the focal plane of the collimating lens D. From there parallel light emerges, which then strikes one side surface of the prism $E_1$ perpendicularly. $E_1$ and $E_2$ are two identical 45° prisms. The hypothenuse surface of one of them has been equipped with a half-transparent foil F, and after that the other prism has been cemented to it, so that a mirror-symmetric interferometric device is formed. The entering radiation is split at the foil F into two coherent light beams which after leaving the double prism proceed to the mirrors $G_1$ and $G_2$. Here the pencils get a vertical direction, and after passage of the optical compensator $H_2$ and the plano-parallel plate $H_1$, the beams strike the two menisci in the vertical tubes $J_1$ and $J_2$ belonging to the osmotic cell K, in which the semipermeable membrane L is clamped between one vertical tube and the cell body. The light is reflected against the menisci and returns the same way back. When the two beams reach the foil F again, they are reunited, and part of each intensity takes the way through the lens M, which gives two superimposed optical images of the menisci in the plane N. There an interference pattern is formed which can be viewed through the eyepiece O. At an optical path difference of zero between the two coherent light beams, this pattern has a characteristic appearance with one non-coloured interference ring and a small number of coloured rings. At a path difference of some wave-lengths these fringes disappear, on account of the use of white light. One can find them again by displacing the optical compensator $H_2$ in one direction or the other, and the path difference can be read from the displacement of the compensator.

The compensator $H_2$ is a double wedge with one component fixed and the other movable with the aid of a micrometer screw which in the figure is only indicated by an arrow. Differently from the generally used compensator, consisting of a rotatable plate, this compensator is linear. The direction of movement of the compensator is in the figure, for the sake of good visibility, in the plane of the paper but in reality the movement is of course made to proceed perpendicularly to this plane.

Instead of the double prism E and the two mirrors G, one can use a double prism according to Koesters.

I claim:

1. Osmometer, characterized by an osmotic cell with one vertical tube for the solvent and one for the solution, and by an interferometric arrangement for the measurement of the difference in level between the menisci in said tubes, this arrangement consisting of a beam-splitting and -reuniting interferometric device composed of a half-transparent foil enclosed between and in optical contact with two congruent and plane surfaces of two optical elements of transparent and homogeneous material with plane outer boundary surfaces which are mutual mirror-images with regard to said foil, said device being so oriented in relation to the osmotic cell that its two vertical tubes become mutual mirror-images with regard to the foil, consisting further of a collimating arrangement which directs the light from an extended light source at an oblique angle against the foil, of an optical system giving optical imagery of the menisci and built up on an axis which at least next to the foil is the mirror-image of the collimator axis with regard to the foil, of reflecting plane surfaces which make the oblique radiation from the foil vertical and directed towards the menisci and which, similarly, make the vertical radiation from the menisci oblique again and directed towards the foil, and, finally, in the way of the radiation to and from one meniscus of an optical compensator, continuously adjustable and readable, and, in the way of the radiation to and from the other meniscus, of a fixed plate of essentially the same optical thickness as the compensator.

2. Osmometer as recited in claim 1, in which all components of the optical system traversed by the beams of light from said light source are positioned with their refracting boundary surfaces between different optical media, including air, substantially perpendicular to the central rays of said beams of light.

References Cited in the file of this patent

UNITED STATES PATENTS

| | | |
|---|---|---|
| 2,256,804 | Hurley | Sept. 23, 1941 |
| 2,418,786 | Nadig | Apr. 8, 1947 |
| 2,517,937 | Peck | Oct. 16, 1951 |

OTHER REFERENCES

National Bureau of Standards, Technical News Bulletin, May 1953, pp. 68 and 69.